A. J. SANFORD.
APPARATUS FOR MAKING CORD PASSAGES IN CANDLESTICKS.
APPLICATION FILED JUNE 24, 1913.
1,272,861.
Patented July 16, 1918.
2 SHEETS—SHEET 1.
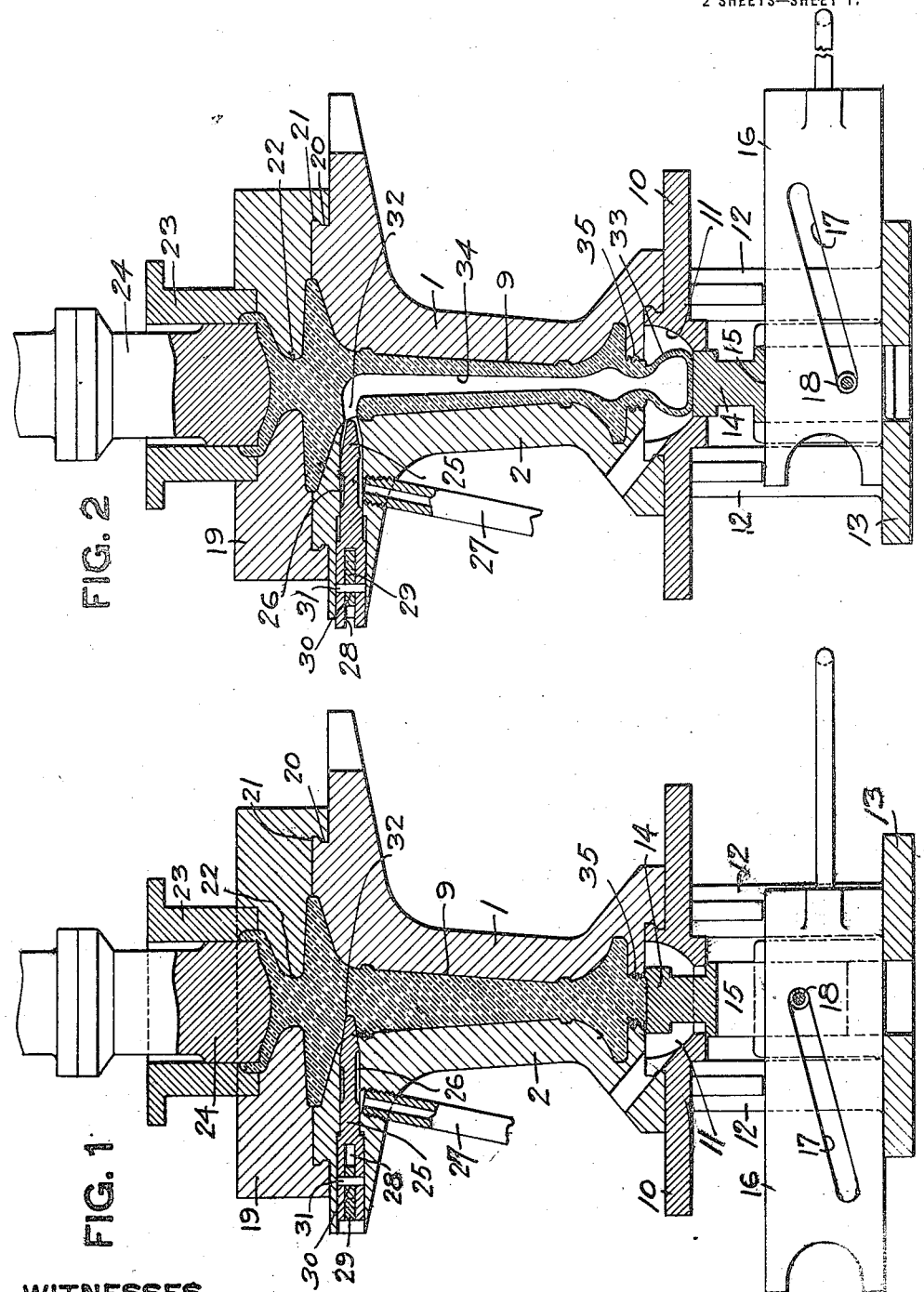
WITNESSES.
INVENTOR.

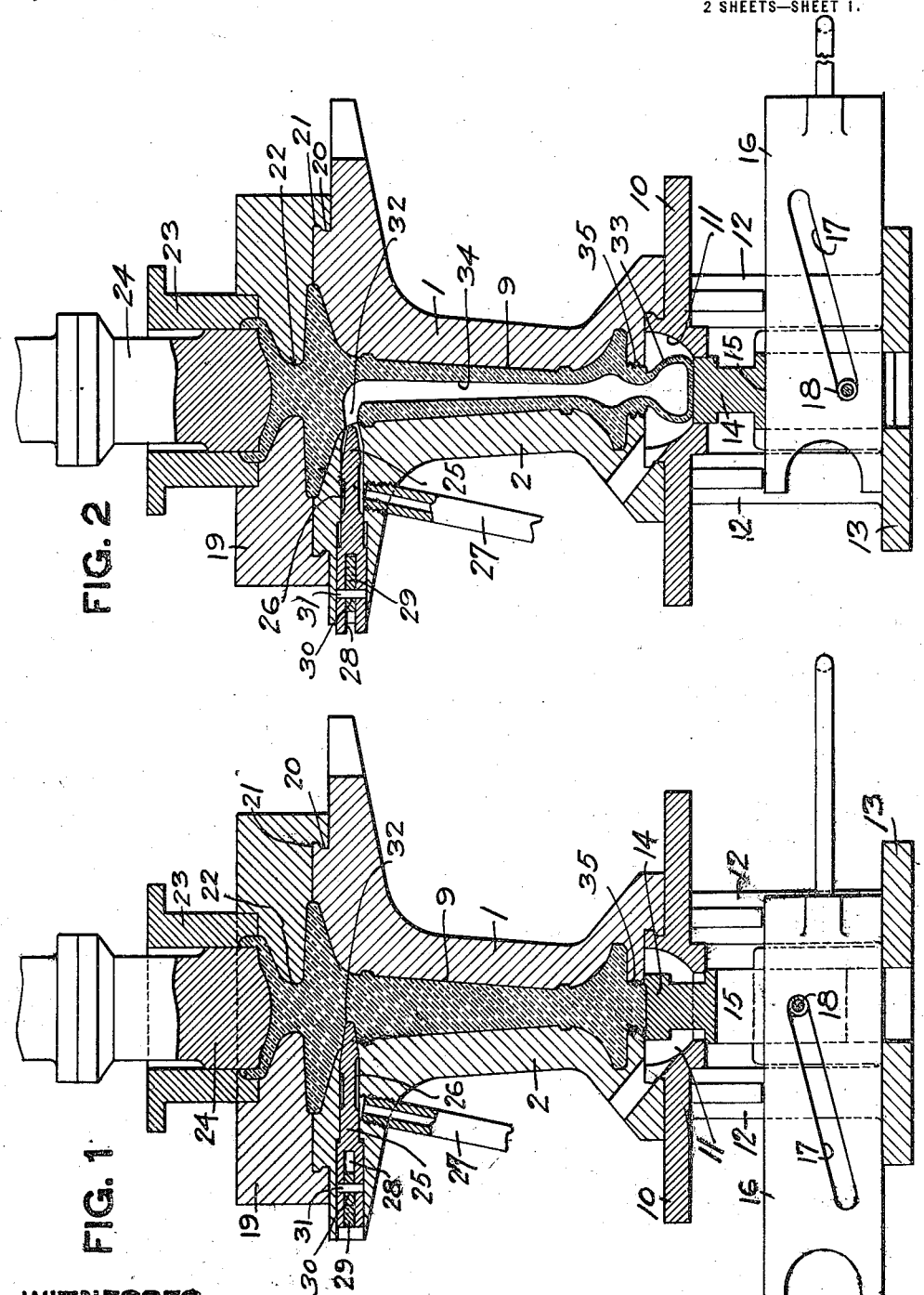

UNITED STATES PATENT OFFICE.

ANDREW J. SANFORD, OF NEWARK, OHIO, ASSIGNOR TO A. H. HEISEY & CO., OF NEWARK, OHIO, A COPARTNERSHIP.

APPARATUS FOR MAKING CORD-PASSAGES IN CANDLESTICKS.

1,272,861.    Specification of Letters Patent.    Patented July 16, 1918.

Application filed June 24, 1913. Serial No. 775.603.

*To all whom it may concern:*

Be it known that I, ANDREW J. SANFORD, a citizen of the United States, and resident of Newark, in the county of Licking and State of Ohio, have invented a new and useful Improvement in Apparatus for Making Cord-Passages in Candlesticks; and I do hereby declare the following to be a full, clear, and exact description thereof.

My invention relates to improved apparatus for manufacturing glass articles and is particularly concerned with improved molding and blowing apparatus for the manufacture of a glass candlestick having a longitudinal passage for the reception of electrical conductors whereby said candlestick may be employed as the standard of an electrolier.

The invention has further for its object means for forming a lateral passage in or near the base of the candlestick communicating with the central passage aforesaid, through which the electric conductors may be readily threaded and carried up through said central passage. A further object is to provide means whereby articles of the character referred to may be economically manufactured chiefly by reason of the fact that the necessary passages for the electric conductors may be formed by blowing said passages in the article while still in a molten or semi-molten state within the mold.

In the drawings which illustrate a preferred embodiment of the apparatus, Figure 1 is a longitudinal vertical section through the apparatus on the line 1—1 Fig. 3; Fig. 2 is a view similar to Fig. 1 showing the parts in different operative position; Fig. 3 is a plan view of the apparatus with the top font and plunger mechanism removed; and Fig. 4 is a longitudinal sectional view of the completed article.

Referring to Figs. 1 to 3 inclusive, the mold proper consists preferably of two longitudinal sections 1 and 2 hinged together by a hinge pintle 3 passing through suitable lugs 4 and 5. The opposite sides of the mold sections may be securely fastened together by means of a pintle or pin 6 passing through lugs 7 and 8 thus forming when the mold sections are together the mold cavity proper 9. The mold sections 1 and 2 are supported upon a suitable base or bottom plate 10 which is provided with a cup shaped recess 11 registering with the lower open end of the mold cavity. The base plate 10 may be supported by a standard 12 from a suitable support 13. Suitably mounted and guided within the base standard 12 and the base plate 10 is a mold closing plunger 14 transversely slotted as at 15 to receive a transversely arranged plunger actuating draw bar 16, said draw bar having therein a cam slot 17 within which projects a pin 18 secured to the stem of the plunger 14. By moving the draw bar to the right, as viewed in Figs. 1 and 2, the plunger 14 may be withdrawn from mold closing position shown in Fig. 1 to the depressed position shown in Fig. 2 for the purpose hereinafter described. Mounted upon the upper ends of the mold sections 1 and 2 is a top font 19 which may be also formed in sections similar to the mold section secured together in substantially the same way. The sections of the top font are provided with the annular shoulders 20 adapted to engage the annular shoulders 21 at the top of the mold sections whereby the top font and mold sections may be securely fastened together. The top font is provided with a neck opening 22 communicating with the mold cavity. Mounted within the annular recess in the top font is a plunger guide and filling ring 23 within which operates a plunger 24 which may be operated in any desired manner to force the glass into all parts of the mold cavity.

In order to form a longitudinal passage within the body of the candlestick while still within the mold and also to extend this passage to the outer surface of the candlestick one of the mold sections as 2, for example, is provided with a valve plunger 25 slidably mounted as here shown, for example, in the base forming portion of the mold section 2. Said valve plunger is provided with an annular passage 26 which when the plunger is withdrawn somewhat from the mold cavity opens communication between the air inlet pipe 27 and the interior of the mold cavity. To actuate the valve plunger the latter is slotted as at 28 to receive a transversely operating valve actuating draw bar 29 (see Fig. 3), this bar having therein a cam slot 30 engaged by a pin 31 mounted in the slotted end of the valve plunger. The air inlet pipe 27 may be provided with a control cock 27ᵃ.

In the operation of the device and with the parts in the position indicated in Fig. 1 the mold cavity 8 is charged with glass and the plunger 24 is brought down to press the glass and spread the same thoroughly into the parts of the mold. The stop plunger 14 is then withdrawn from the bottom of the mold cavity by means of the draw bar 16 and depressed to the bottom of the cup shaped recess 11 in the base plate 10. The valve plunger 25 is then withdrawn to the position shown in Fig. 2 whereby the necessary blast of air is introduced through the lateral opening 32 formed in the side wall of the candlestick by the valve plunger, said air blast forcing the soft molten glass at the longitudinal center of the candlestick downwardly and into the cavity 11 of the base plate in the form of a bubble 33 thereby forming through the center of the candlestick a passage 34. The mold sections are then opened and the article removed. The surplus glass at either end of the formed article is cracked off and the article finished by polishing or grinding as desired. The mold may be constructed to simultaneously form a threaded boss 35 at the top of the candlestick to which the threaded socket of the electric lamp may be secured.

It will be seen therefore that in the single molding operation the article is shaped laterally, perforated, and immediately thereafter has formed therein the longitudinal passage for the reception of the electric conductors, said passage communicating with the lateral opening formed by the valve plunger 25. By the use of this apparatus, therefore, considerable economy in manufacture is secured and a candlestick produced having the conductor passages formed therein in a manner to permit of ready and convenient insertion of electric conductors and to present an ornamental appearance.

While I have herein described the particular embodiment of the invention, it is to be understood that the same may be altered in details and in the relative arrangement of parts within the scope of the appended claims.

What I claim is:

1. In a glass molding and blowing apparatus, the combination with a mold, of a plunger for closing the lower end of said mold, a top font overlying the upper end of said mold, a plunger operating in said top font to press the glass into all parts of the mold, a valve plunger operating laterally through said mold to form a lateral passage in the article, and means for introducing a blast of air through the passage occupied by said valve plunger to blow a longitudinal passage from said lateral passage out through one end of said article.

2. In apparatus for molding and blowing glass articles, the combination with a sectional mold and a base plate therefor, said base plate having a cavity therein registering with the lower end of the mold cavity, of means adapted normally to close the lower end of the mold cavity, a valve plunger operating through the opposite end of one of said mold sections and adapted to form a lateral passage in the article during the molding operation, means for actuating said valve plunger to admit a blast of air through said lateral passage to continue said lateral passage longitudinally of the article and out through the lower end thereof and means to open said cavity for the reception of the glass displaced in blowing said longitudinal passage.

3. In a glass molding and blowing apparatus, the combination of longitudinal sectional mold members, of a base plate adapted to carry the same, said base plate having a cavity registering with the lower end of the mold cavity, a top font carried by said mold sections, a presser plunger operating in said top font to force the glass into all parts of the mold cavity, a closer member for the lower end of the mold cavity operating in said base plate cavity, a valve plunger operable in the upper end of one of said mold sections and adapted to form a lateral passage in one end of the molded article during the molding operation, means for withdrawing said closer member from the mold cavity to the bottom of said base plate cavity, and means for withdrawing said valve plunger from the mold cavity to thereby admit a blast of air through the lateral passage formed by said plunger to blow a passage longitudinally of the article and carry the surplus glass into said base plate cavity.

In testimony whereof, I the said ANDREW J. SANFORD have hereunto set my hand.

ANDREW J. SANFORD.

Witnesses:
 MAX B. NORPELL,
 GEORGE A. BLOOD.